United States Patent [19]

Doan

[11] Patent Number: 4,778,627

[45] Date of Patent: Oct. 18, 1988

[54] DISPOSABLE HAZARDOUS AND RADIOACTIVE LIQUID HYDROCARBON WASTE COMPOSITION AND METHOD

[75] Inventor: Darryl J. Doan, Laurel, Mont.

[73] Assignees: James William Ayres; Farrell Dean Rowsell, both of Las Vegas, Nev.

[21] Appl. No.: 54,141

[22] Filed: May 11, 1987

Related U.S. Application Data

[63] Continuation of Ser. No. 818,323, Jan. 13, 1986, abandoned.

[51] Int. Cl.⁴ .......................... G21F 9/08; G21F 9/16; C09K 3/00

[52] U.S. Cl. .................................... 252/631; 210/682; 210/691; 210/751; 210/908; 210/909; 252/628; 252/633; 252/634; 252/635; 405/128; 405/129

[58] Field of Search ............... 252/628, 631, 626, 633, 252/634–635; 405/128, 129; 210/679, 680, 681, 682, 690, 691, 693, 908, 909, 910; 106/285

[56] References Cited

U.S. PATENT DOCUMENTS

| | | | |
|---|---|---|---|
| 2,367,384 | 1/1945 | Tymstra et al. | 210/0 |
| 2,531,427 | 11/1950 | Hauser | 260/448 |
| 2,937,142 | 5/1960 | Rios | 210/40 |
| 2,966,506 | 12/1960 | Jordan | 260/448 |
| 3,167,504 | 1/1965 | Hayden, Jr. et al. | 210/24 |
| 3,196,106 | 7/1965 | Haden, Jr. et al. | 210/24 |
| 3,274,784 | 9/1966 | Shock et al. | 252/628 |
| 3,422,185 | 1/1969 | Kuritzkes | 424/61 |
| 3,487,928 | 1/1970 | Canevari | 210/40 |
| 3,948,770 | 4/1970 | Goodrich et al. | 210/40 |
| 3,974,125 | 8/1976 | Oswald et al. | 260/40 |
| 4,033,764 | 7/1977 | Colegate et al. | 423/24 |
| 4,070,282 | 1/1978 | Otto | 210/27 |
| 4,081,496 | 3/1978 | Finlayson | 260/864 |
| 4,105,578 | 8/1978 | Finlayson et al. | 252/316 |
| 4,113,504 | 9/1978 | Chen et al. | 106/97 |
| 4,149,968 | 4/1979 | Kupiec | 210/28 |
| 4,167,481 | 9/1979 | Cremers et al. | 210/36 |
| 4,231,866 | 11/1980 | Moser et al. | 210/660 |
| 4,276,164 | 6/1981 | Martone et al. | 210/170 |
| 4,279,756 | 7/1981 | Weiss et al. | 210/667 |
| 4,439,062 | 3/1984 | Kingsbury | 405/35 |
| 4,473,477 | 9/1984 | Beall | 210/691 |

FOREIGN PATENT DOCUMENTS 1280373 7/1972 United Kingdom .

OTHER PUBLICATIONS

Hurlbut et al., 1977, Manual of Mineralogy, 19th edition. John Wiley and Sons, New York, pp. 402–403.

*Primary Examiner*—Stephen J. Lechert, Jr.
*Assistant Examiner*—Howard J. Locker
*Attorney, Agent, or Firm*—Jerry R. Seiler

[57] ABSTRACT

An improved method of disposing of radioactive or hazardous liquid hydrocarbon compositions comprises placing the liquid hydrocarbons in a container and adding an organic ammonium montmorillonite in ratios of between about 1:2 and 3:1, by volume, respectively. The organic ammonium montmorillonite has at least 10 carbon atoms. A polar organic compound having between 1 and about 10 carbon atoms is also preferably added with the montmorillonite. Where the liquid waste material includes 5% or more of water in addition to the liquid hydrocarbon a minus 200 mesh sodium montmorillonite is also preferably added.

8 Claims, No Drawings

DISPOSABLE HAZARDOUS AND RADIOACTIVE LIQUID HYDROCARBON WASTE COMPOSITION AND METHOD

This is a continuation of co-pending application Ser. No. 06/818,323, filed on Jan. 13, 1986 (abandoned).

BACKGROUND OF THE INVENTION

The disposal of hazardous and radioactive waste materials is of extreme importance. Federal and state laws and requirements covering such disposals are particularly severe and stringent due to the dangers to plant and animal life if the desired standards are not met and the hazardous or radioactive materials become exposed to the environment. Because of the potential dangers, the United States Nuclear Regulatory Commission has not only identified the hazardous and radioactive materials to date, which list is continually being amended and updated, but has set forth specific standards and requirements for protecting the environment against such waste materials. The resulting laws and regulations are set forth in 10 CFR, particularly sections 1–199. Other regulations relating to transportation, packaging, labeling and identifying hazardous and radioactive materials are also found in 40 CFR 1–799 and 49 CFR 100–177. Other publications which relate to classifying, indexing and discussing radioactive and hazardous waste materials include DOE/LLW-14T publication "Waste Classification, A Proposed Methodology For Classifying Low-Level Radioactive Waste", Dec. 1982, DOE/LLW-17T, "Survey Of Chemical And Radiological Indexes Evaluating Toxicity", March 1983, FW-874, "Hazardous Waste Land Treatment", April 1983 and FW-872 "Guide To The Disposal Of Chemically Stabilized and Solidified Waste", September 1982.

It is the common practice to process liquid hazardous or radioactive materials by adding absorbents in an attempt to enhance handling and transportation, as well as eventual storage thereof. The materials that have been used heretofore include diatomaceous earth, vermiculite or expanded mica such as zonolite and krolite, portland and gypsum cements, as well as clay materials such as calcium bentonites. A problem with such materials is that only a relatively small amount of liquid can be absorbed or otherwise treated with less than satisfactory results. For example, liquid materials are desirably transported and disposed of in 55 gallon drums. However, it has been found with the use of these absorbents, solid compositions cannot be achieved or if temporarily achieved, liquid separation occurs during transportation or storage. Any separated or free-standing liquids are especially undesirable because of the potential danger of leakage from a ruptured or opened container. It is to the substantial elimination of such problems that the present invention is directed.

SUMMARY OF THE INVENTION

An improved method of treating hazardous and radioactive organic or hydrocarbon waste compositions comprises placing the materials in a container, such a 55 gallon drum, and adding an organic ammonium montmorillonite with stirring until the mixture has substantially solidified. It is also desirable to add a small amount of polar organic solvent with the organic ammonium montmorillonite to speed up the solidification process. Where over about 5%, by volume, of waste liquid composition is water, it is also desirable to add sodium montmorillonite with the organic ammonium montmorillonite in amounts directly proportional to the amount of water present in the waste. The resulting substantially solidified waste material may be handled, transported and stored under a variety of conditions for extended periods of time without evidence of liquid separation or deterioration. These and other advantages as well as the specific materials used in the invention will be more particularly described in the following detailed description.

DETAILED DESCRIPTION OF THE INVENTION

The method of solidifying the hazardous and radioactive liquid waste compositions according to the invention applies to a great variety of such materials. For example, in the radioactive waste disposal field, liquids which must be treated and disposed of include reactor plant organic liquids such as turbine, cutting and lubricating oils, solvent sludges which are used to degrease the reactor components such as Freon TF, cleaning solvents such as Stoddard solvents, decontamination solvents, and aqueous mixtures of the above-noted organic materials, particularly those containing between from 5 to about 75% hydrocarbons and even up to 100% hydrocarbons. In addition, a great quantity of such wastes are aqueous liquids, containing over about 95% water contaminated with radioactive materials such as greases from reactor plant turbines. Hospital-sourced contaminated liquids contain radioactive materials used in cancer treatments. From such sources, particularly common materials include the radioactive cobalts such as cobalt 57, cobalt 58 and cobalt 60, cesium, plutonium and uranium isotopes, and the like. However, it is to be understood, according to the invention, that any radioactive materials that are to be disposed of and are defined in the aforesaid laws, regulations, and documents are intended to be included in the compositions treated according to the method of this invention, as well as any later identified and added radioactive materials, regardless of source and regardless of the specific radioactive material or radioisotope.

Common hazardous waste materials include acids, bases, chlorinated hydrocarbons including PCB, dioxins, and the like. Again, these as well as the radioactive materials may be in aqueous liquids, containing up to substantial amounts of hydrocarbons. Moreover, as used herein, "hydrocarbons" is intended to define any such oils, solvents and other organic or non-aqueous liquids as generally described above which have been contaminated with radioactive materials or which themselves are considered hazardous chemicals according to governmental regulations.

The primary material used in the method of the present invention for treating and substantially solidifying liquid organic or hydrocarbon containing hazardous and radioactive waste materials is an organic ammonium montmorillonite composition consisting of sodium montmorillonite and a salt of an amine or a quaternary ammonium salt having at least 10 carbon atoms in the organic portion of the molecule. The montmorillonite may be a calcium, magnesium or sodium montmorillonite, or mixtures of two or more of these montmorillonites, or may be another water swelling mineral with significant ion exchange capacity such as Saponite, Hectorite, Beidellite, Nontronite, Stevensite and Sauconite. Although for some uses the montmorillonite or other mineral may be combined directly with the amine salt to produce the organic ammonium montmorillonite, where sodium is not the major exchangeable cation, it is preferred to exchange sodium for the calcium or magnesium. This may be readily accomplished by mixing the mineral with an aqueous solution of a sodium salt such as sodium carbonate or sodium chloride and recovering the high sodium content product. A preferred material is a sodium montmorillonite having preferably over 50% milliequivalent exchangeable cation concentration, more preferably between about 60 and about 75% sodium meq/% in which the sodium has been exchanged for an organic ammonium component through ion exchange reactions. A most preferred sodium montmorillonite is disclosed in co-pending application Ser. No. 743,057 filed June 10, 1985, the description thereof being incorporated herein by reference.

The above-described minerals, their high sodium ion-exchange products, or sodium montmorillonite are reacted with a primary, secondary or tertiary amine, amine salt, or a quaternary ammonium salt. Suitable compounds within this definition are those disclosed and prepared by reactions described in U.S. Pat. Nos. 2,531,427 and 2,966,506, the relevant portions thereof being incorporated herein by reference. Preferred amines used are those containing at least 10 carbon atoms such as dodecyl, hexadecyl, octadecyl, dimethyloctadecyl, and the like. However, the amines may be aliphatic, aromatic, cyclic, heterocyclic, or polyamines, A readily available and useful material is dimethyl dihydrogenated tallow ammonium montmorillonite. The aforesaid montmorillonite, minerals, or sodium montmorillonite may be reacted with the amine or ammonium salts by mixing or mulling the dry base material with the selected amine. Alternatively, a wet process may be used wherein the base mineral is slurried in fresh water and the amine or ammonium salt is added and properly mixed. The reaction product is filtered or centrifuged and then dried to a low moisture content. A small but important and significant percentage of water is retained to attain maximum product efficiency. Usually a few percent of water, say between about 1 and about 5% water based on the final organic ammonium montmorillonite is preferred. The resulting organic ammonium montmorillonites are highly organophyllic and thus useful in the process of the invention for substantially solidifying the waste liquid hydrocarbon materials.

In solidifying (substantially solidifying) substantially 100% hydrocarbon radioactive or hazardous waste liquids, the organic ammonium montmorillonite may be used alone, although preferably a polar organic compound will also be added as will be explained hereinafter. The amount of montmorillonite used in the process will achieve a liquid hydrocarbon:montmorillonite ratio of between about 1:2 and 3:1, by bulk volume, respectively. The liquid hydrocarbon is placed normally in a vessel or container, commonly a 55 gallon drum, and the montmorillonite is added slowly over a period of at least a few minutes with continued stirring until the composition becomes solidified. By the term "solidified" or "substantially solidified" herein it is intended to define a material which is not pourable.

The solidification process is enhanced by additionally adding a polar organic compound with the organic ammonium montmorillonite as it is stirred and blended with the liquid waste material. The addition of the polar organic compound provides for substantial reduction in the amount of organic ammonium montmorillonite required to achieve the same substantial solidification of liquid. It has been found that for some hydrocarbon wastes, the amount of organic ammonium montmorillonite needed for solidification is reduced by 50% or more. Suitable polar organic compounds include alcohols, carbonates, acetates, ethers, ketones, benzoates and halogenated hydrocarbons having between about 1 and about 10 carbon atoms. Within these groups samples of suitable materials include diethyl carbonate, propylene carbonate, methylacetate, ethylacetate, isoamylacetate, diisopropyl ether, diethyl ether, methylethyl ketone, diethyl ketone, diisopropyl ketone, ethyl benzoate, trichloroethane, carbon tetrachloride, and chlorobenzene. Most preferred are the lower molecular weight alcohols having between 1 and about 8 carbon atoms, particularly methyl alcohol, ethyl alcohol, n-propyl alcohol, isopropyl alcohol, tert-butyl alcohol, etc. These examples are intended only to indicate a number of useful polar organic solvents or compounds and the list is not intended to be exhaustive. The amount of polar organic compound will be between about 1 and about 10% of the volume of liquid hydrocarbon, preferably around 5%. The addition of the polar organic compound is particularly desirable where the hydrocarbon liquid is above about 70% volume of the waste liquid being treated.

Where the liquid hydrocarbon waste composition contains substantial amounts of water, i.e., between 5 and 95% by volume of the waste material to be treated, it is also desirable according to the invention to include a finely divided sodium montmorillonite in which at least a major portion and up to substantially all of the particles are about 200 mesh or smaller. A preferred sodium montmorillonite is described in U.S. application Ser. No. 743,057, filed June 10, 1985 and incorporated by reference herein. Accordingly, the preferred sodium montmorillonite used has over about 50% milliequivalent exchangeable cation concentration and more preferably above about 60%. Even more preferred materials are those having a cation exchange capacity up to even 95-100 meq/% with nominal ranges of the preferred material being between about 75 and about 80 meq/%. When treating waste materials containing between 5 and 95% water mixed with hydrocarbon liquid, the organic ammonium montmorillonite and sodium montmorillonite mixture is used at the rate of between about 2.3 and about 4.6 pounds of mixture per gallon of liquid waste. Moreover, the amount of sodium montmorillonite used is such as to give a ratio of organic ammonium montmorillonite:sodium montmorillonite that is about directly proportional to the ratio of liquid hydrocarbon:water, by volume, respectively. Otherwise, the materials added in the same way as previously described with the organic and sodium montmorillonites being added separately or together to the liquid waste material to be solidified while stirring until substantial solidification is achieved.

In treating hazardous or radioactive liquid hydrocarbon-water mixtures in which the hydrocarbon is present above about 70% and up to about 95%, it is further preferred to additionally add a polar organic compound as previously described to the organic ammonium montmorillonite and sodium montmorillonite treating mixture. The amount of polar organic compound added will also be as previously described, i.e., between 1 and about 10% based on the volume of liquid hydrocarbon being treated. Again, the use of the polar organic activator substantially reduces the amounts of organic ammonium montmorillonite required to obtain suitable hydrocarbon liquid solidification.

In treating the waste liquid compositions to obtain solidification, as previously noted, the waste material is placed in a 55 gallon drum and the montmorillonite is added with stirring until substantial solidification is achieved. Where mixtures of organic ammonium montmorillonite and sodium montmorillonite are used, these montmorillonites may be mixed and added at one time with stirring or they may be added separately. Where activator is used, it is preferred to stir in the organic ammonium montmorillonite or the mixture thereof with sodium montmorillonite first and thereafter add the polar organic compound which is then mixed well. If additional solidification is needed after the initial amounts of the aforesaid montmorillonites and polar organic compound have been mixed with the waste material, additional mixture of the aforesaid montmorillonites and polar organic compound may be added at a convenient ratio of 1 gallon of the polar organic compound per 100 pounds of the organic ammonium montmorillonite present in the mixture. The composition should again be stirred and the drum then sealed for 24 hours and thereafter inspected. If any free liquid is standing or has risen to the top of the composition, additional montmorillonite mixture and polar organic compound in the same proportions as above described should be added with stirring to complete the solidification process.

By way of examples different liquid hydrocarbon hazardous waste materials were treated as follows:

EXAMPLE I

Forty-five gallons of a hazardous mixture of waste lubricating and cutting oil were placed in a 55 gallon drum. To the liquid hydrocarbon waste mixture was added 185 pounds of dimethyl dihyrogenated tallow ammonium montmorillonite with stirring. The resulting mixture became set up within 24 hours to a thick unpourable composition.

EXAMPLE II

Another 45 gallon sample of the hydrocarbon waste mixture of Example I was treated by adding 130 pounds of the same organic ammonium montmorillonite and 2.7 gallons of methyl alcohol. The mixture was stirred for about 5 minutes during which time it set up to a thick, stiff, unpourable composition.

EXAMPLE III

A 45 gallon mixture of 50% hydrocarbon waste of Example I and 50% water were treated by adding a mixture of 50 pounds of the same organic ammonium montmorillonite and 50 pounds of sodium montmorillonite (minus 200 mesh) with stirring. After 24 hours the composition was a thick but flowable liquid. To this mixture was added 1 gallon of methyl alcohol with stirring. After about 15 minutes the mixture had set up to become a very stiff and unpourable composition.

EXAMPLE IV

To a sample of the same hydrocarbon, water mixture of Example III was added a mixture of 80 pounds of the Example I organic ammonium montmorillonite and 80 pounds sodium montmorillonite (minus 200 mesh) with stirring for about 15 minutes to achieve the same Example III consistency.

I claim:

1. A method of treating a radioactive or hazardous waste material consisting essentially of liquid hydrocarbon composition comprising placing said radioactive or hazardous liquid hydrocarbon composition in a container and mixing therewith an organic ammonium montmorillonite, said liquid hydrocarbon:organic ammonium montmorillonite ratio being between about 1:2 and 3:1, by volume, respectively, said organic ammonium montmorillonite having at least 10 carbon atoms therein, and between about 1 and about 10% by volume of said liquid hydrocarbon composition a low molecular weight aliphatic alcohol having from 1 to 8 carbon atoms until the composition comprises an unpourable, free standing solid.

2. The method of claim 1 wherein said organic ammonium montmorillonite comprises a quaternary ammonium montmorillonite.

3. A solidified hazardous or radioactive liquid hydrocarbon composition consisting essentially of said liquid hydrocarbon, an organic ammonium montmorillonite having at least 10 carbon atoms, and a low molecular weight aliphatic alcohol having from 1 to 8 carbon atoms, the ratio of said liquid hydrocarbon and said organic ammonium montmorillonite being between about 1:2 and about 3:1, by volume, respectively, and said alcohol being between about 1 and about 10% by volume of said liquid hydrocarbon and wherein said composition comprises an unpourable, free standing solid.

4. A method of disposing of a hazardous or radioactive liquid composition consisting essentially of between about 5 and about 95% liquid hydrocarbon nd between about 95 and about 5% water, by volume, respectively, comprising placing said liquid in a container, adding between about 2.3 and about 4.6 pounds of a mixture of an organic ammonium montmorillonite and sodium montmorillonite of at least 50% minus 200 mesh particle size per gallon of said liquid composition wherein the ratio of said organic ammonium montmorillonite: sodium montmorillonite is about directly proportional to the ratio of liquid hydrocarbon:water, by volume, respectively, and between 1 and about 10% aliphatic alcohol having between 1 and 8 carbon atoms based on the volume of said liquid hydrocarbon, while stirring to achieve an unpourable, free standing solid.

5. A solidified hazardous or radioactive liquid composition consisting essentially of a waste portion of between about 5 and about 95% liquid hydrocarbon and between about 95 and about 5% water, by volume, respectively, between about 2.3 and about 4.6 pounds of a mixture of an organic ammonium montmorillonite and sodium montmorillonite having a nominal particle size of minus 200 mesh per gallon of said waste portion, the ratio of organic ammonium montmorillonite:sodium montmorillonite being about directly proportional to the ratio of liquid hydrocarbon:water, by volume, respectively, and between 1 and about 10% aliphatic alcohol having between 1 and 8 carbon atoms based on the volume of said liquid hydrocarbon and wherein said composition comprises an unpourable, free standing solid.

6. The composition of claim 5 wherein said organic ammonium montmorillonite has at least 10 carbon atoms.

7. A method of treating a radioactive or hazardous waste material consisting essentially of liquid hydrocarbon comprising placing said radioactive or hazardous liquid hydrocarbon composition in a container and mixing therewith an organic ammonium montmorillonite, said liquid hydrocarbon:organic ammonium montmorillonite ratio being between about 1:2 and 3:1, by volume, respectively, said organic ammonium montmorillonite having at least 10 carbon atoms therein, and between about 1 and about 10% by volume of said liquid hydrocarbon composition a low molecular weight polar organic compound having between 1 and about 10 carbon atoms selected from the group consisting of aliphatic ketones, aliphatic acetates and aliphatic alcohols until the composition is substantially solid.

8. The method of claim 7 wherein said polar organic compound is selected from the group consisting of isopropyl alcohol, hexyl alcohol, ethyl acetate and methyl ethyl ketone.

* * * * *